Figure 1:
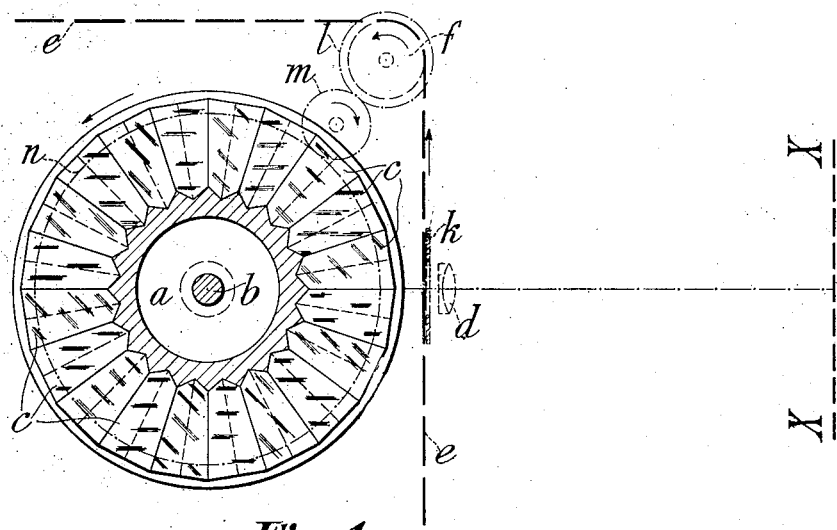

W. BAUERSFELD.
CINEMATOGRAPHIC APPARATUS.
APPLICATION FILED DEC. 20, 1913.

1,154,835.

Patented Sept. 28, 1915.
3 SHEETS—SHEET 1.

Witnesses:

Inventor.
Walther Bauersfeld.

W. BAUERSFELD.
CINEMATOGRAPHIC APPARATUS.
APPLICATION FILED DEC. 20, 1913.

1,154,835.

Patented Sept. 28, 1915
3 SHEETS—SHEET 2.

W. BAUERSFELD.
CINEMATOGRAPHIC APPARATUS.
APPLICATION FILED DEC. 20, 1913.

1,154,835.

Patented Sept. 28, 1915.
3 SHEETS—SHEET 3.

Inventor:
Walther Bauersfeld

UNITED STATES PATENT OFFICE.

WALTHER BAUERSFELD, OF JENA, GERMANY, ASSIGNOR TO THE FIRM OF CARL ZEISS, OF JENA, GERMANY.

CINEMATOGRAPHIC APPARATUS.

1,154,835.        Specification of Letters Patent.     Patented Sept. 28, 1915.

Application filed December 20, 1913. Serial No. 808,005.

*To all whom it may concern:*

Be it known that I, WALTHER BAUERSFELD, a citizen of the German Empire, residing at Jena, Germany, have invented a new and useful Cinematographic Apparatus, of which the following is a specification.

The present invention relates to cinematographic apparatus, in which, both when taking and when projecting the pictures, the film is continuously moved and in which optical means are provided in order to prevent this movement of the film from causing a wandering of the image on the film (when the photograms are being taken) or on the screen (during the projection of the said photograms). The optical means for this compensation consist usually of a rotatable drum placed in the path of the rays which is fitted with a ring of optical members, e. g. lenses, prisms or reflectors, and is rotated uniformly, so that, the traversing speed of the film and the angular speed of the drum being correctly chosen, a stationary image is obtained. It is, however, well known, that with the existing constructions of the said compensating drum a perfectly stationary and constantly sharp image cannot be obtained. There still remain small movements and places where the image-points are not sharp, particularly in the outer parts of the image, which may cause a flickering of the image. In addition to this, with the majority of such constructions the luminosity of the image is not constant, but decreases considerably in the transitional position of two images. According to the present invention these drawbacks may be in part considerably reduced and in part entirely removed, by fitting the compensating drum with a ring of central reflectors. A central reflector consists, as is well known, of three plane reflecting surfaces, which are perpendicular to one another, and has the property, that object and reflected image occupy such a position with respect to the center of the reflector that the connecting line between each object-point and its corresponding point in the image passes through the center of the reflector and is halved by the said center. Hence each ray, which enters at any desired inclination to the reflector axis and with any desired orientation with regard to the reflector, will emerge, after being reflected at all three reflecting surfaces, in a parallel but opposite direction, the entering and the emerging ray lying in a plane, which passes through the center of the reflector, and the center of the reflector halving the distance between the two rays. Hence, on an object being moved along in front of the reflector in a straight line, the image wanders with regard to the reflector by the same amount in a parallel direction toward the opposite side; on the central reflector being displaced simultaneously at half the speed in a direction of motion parallel to that of the object, there results an image, which is stationary in all points relative to space. An incidental simultaneous rotation of the central reflector about any axis has no influence on the production of the stationary image, provided only that the effective rays are reflected at all three reflecting surfaces, as the position of the image depends only on the position for the moment of the center of the reflector. Hence, when utilizing central reflectors for the optical compensation of the wandering of the image in cinematographic apparatus, an absolutely stationary image may be obtained, when the center of the reflector and the film are moved in parallel paths, the speed of travel of the former being half that of the latter. As an accurately rectilineal guiding of the center of the reflector presents constructional difficulties, it will suffice in practice to replace the straight line by the arc of a circle, the central reflectors being fixed on a drum of so large a radius that tangent and arc coincide with sufficient accuracy on the section in use. Such a drum is disposed at a suitable place, e. g. between objective and film, in the path of the rays of the cinematographic apparatus, for instance in such a manner that the axis of rotation of the drum lies in that plane, which passes perpendicularly to the direction of motion of the film through the center of the film-window. It may also be recommended from constructional reasons, to lay the axis of the drum parallel to the plane of the film and correspondingly to dispose the optical axes of the central reflectors substantially radially to the axis of the drum. When the central reflector consists of plane reflecting plates, *i. e.* when the space within the reflector is filled with air, the center of the reflector, which determines the position of the reflected image, is, as is well known, given by the point of intersection of the three reflecting planes. For the way the central reflectors are to be used in the present case, however, it is better, to fill the space within the reflector with glass, so that a reflecting prism is formed having three reflecting surfaces. With such an arrangement the optical center of the reflector is somewhat displaced relatively to the physical corner point in consequence of the refractions occurring at the points of entrance and emergence. This must be taken into account, when the angular speed of the reflector drum is being determined.

For obtaining a constant luminosity of the image formed, it is necessary on the one hand, for all effective rays proceeding from the object always to be projected to the right locus, while on the other hand no point of the object may be reflected simultaneously by more than one reflector. The first condition is complied with in central reflectors, when the size of the reflecting surfaces is dimensioned so as to correspond to the size of the picture; the second condition can be fulfilled in a simple manner by a diaphragm corresponding to the size of the picture or by the size of the film-window.

When constructing the apparatus, it should on the one hand be seen to, that the reflecting surfaces have such dimensions that the impinging rays are reflected successively by all three surfaces, and on the other hand that each new picture on the film is provided with a new central reflector with a correspondingly placed center. As these two conditions would with normal central reflectors necessitate the prisms being given unsuitable dimensions, it is to be recommended to divide each central reflector into two separate parts, a simple reflecting prism and a ridge prism, which are spaced so far apart that the removal of the optical center of the reflector from the film, caused thereby, results in reasonable dimensions being obtained for the construction of the reflecting bodies and the whole apparatus. Such an arrangement at the same time allows of a simple mode of fixing the two reflector-parts, viz. by cementing them to two plano-parallel glass plates, which are both fixed rigidly to the body of the drum. Besides this, the space between the two reflecting parts permits of the introduction of adjustable glass wedges, by means of which the optical length of the path of light and thereby the position of the optical center of the reflector may be varied, so that in this way convenient means are given of adjusting the rotatory speed of the optical center of the reflector to the traversing speed of the film.

Figure 2:
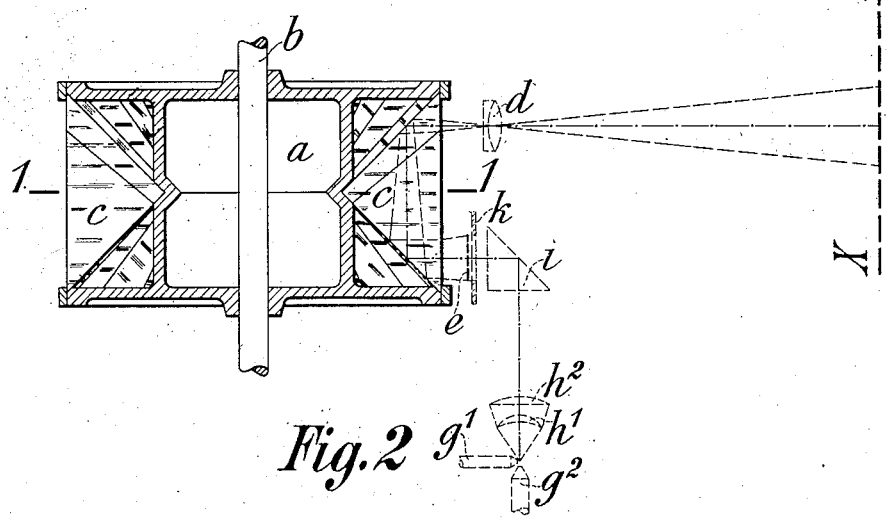
Figure 3:
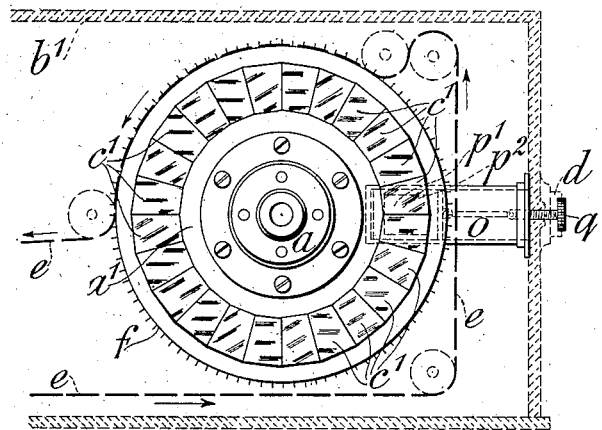
Figure 4:
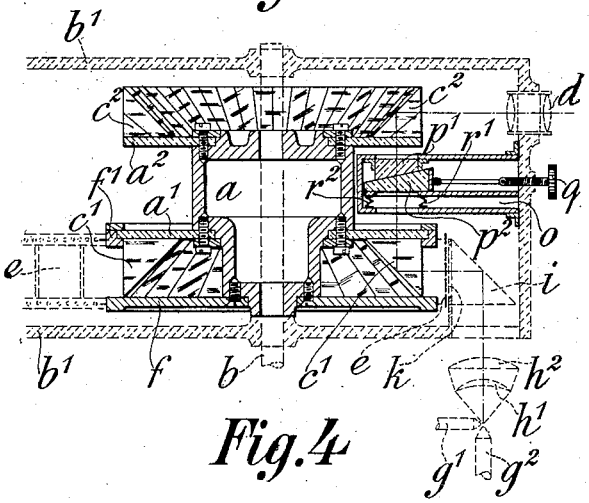

In the annexed drawing: Figures 1 and 2 show one form of the reflector drum according to the invention with undivided central reflectors, Fig. 1 being a cross-section on line 1—1 of Fig. 2 with the prisms left entire and Fig. 2 an axial section. Figs. 3 and 4 show another form of the reflector drum, the bottom disk $f$ being omitted in Fig. 3, and Fig. 4 being an axial section.

Figure 5:
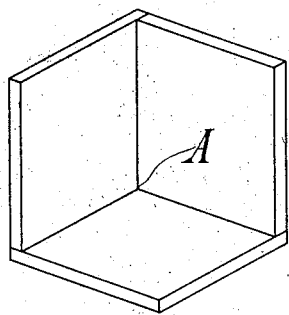
Figure 6:
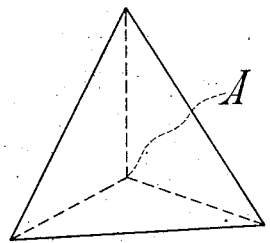
Figure 7:
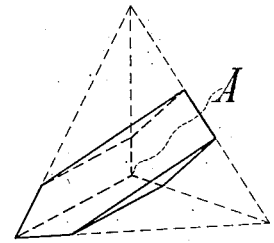
Figure 8:
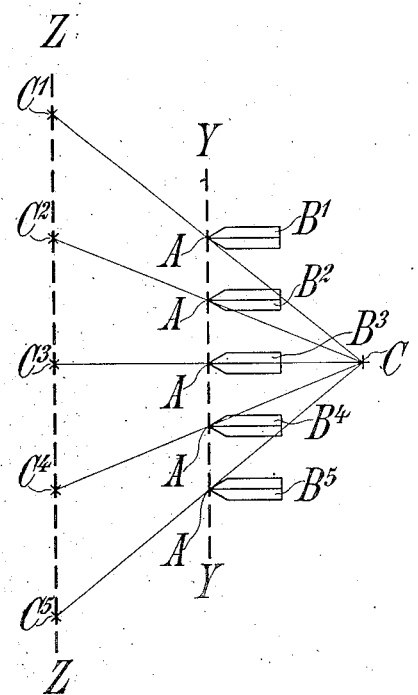
Figure 9:
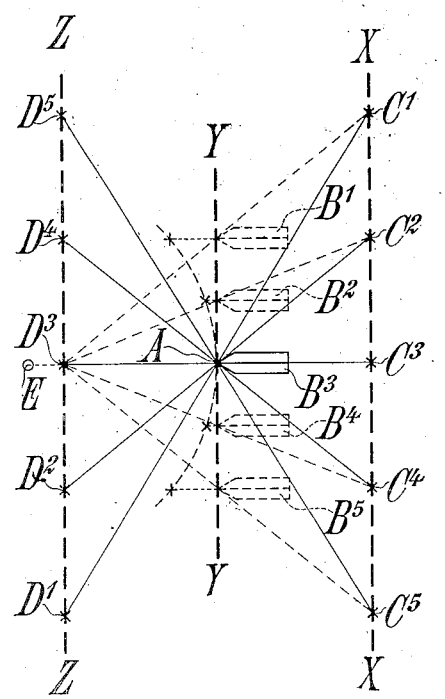

In these figures the most essential parts of the necessary cinematographic apparatus are indicated diagrammatically, it being assumed, that the reflector drum is introduced into the path of the rays between objective and film and that the apparatus is being used as a projection apparatus. Figs. 5 to 7 show three different examples of central reflectors in perspective. Figs. 8 and 9 show diagrammatically how a central reflector acts in the present case. The central reflector of Fig. 5 consists of three plane reflectors which are perpendicular to each other and meet in one point, A. The central reflector of Fig. 6 is formed as a glass tetrahedron with three of its surfaces, which are perpendicular to each other and meet in one point, A, forming the reflecting surfaces. In Fig. 7 the central reflector of Fig. 6 is indicated in thin dotted lines, and shown in full lines is a prism, which is cut out of the said central reflector and forms only a comparatively thin plate. A central reflector of the kind shown in Fig. 7 is employed in the arrangement with the central reflector acting in the manner represented in Figs. 8 and 9. With this prism, as is mentioned farther back in this specification, the center of the reflector is not formed by the point A itself, but by a point lying a certain distance from the point A, which point is arrived at when taking into account the refraction taking place on the rays entering and emerging. For the sake of clearness, however, Figs. 7 and 8 are drawn as if the center of reflection coincided with the point A. In Fig. 8 a central reflector is drawn in five different positions, which are marked with the letters $B^1$ to $B^5$. An object point is marked C. If the central reflector be moved from the position $B^1$ to the position $B^5$ and the point A during this movement follows the straight line Y Y, the image of the object point formed by the central reflector lies in the points $C^1$ to $C^5$ one after another, the straight line Z Z, on which these points lie, having the same distance from the line Y Y as the point C has from the line Y Y. In Fig. 9 a central reflector is drawn in full lines in its mean position $B^3$. If the object point were to occupy on the straight line X X the positions $C^1$ to $C^5$ one after another, the reflector meanwhile remaining at rest, its image would lie at the points $D^1$ to $D^5$ one after another. Should the image of the object point be required to remain constantly in the point $D^3$, it is obvious that during the movement of the object point the reflecting prism would have to be brought in each case into the corresponding position shown by dotted lines. Hence the reflecting prism would obviously have to be moved in the same sense, in which the object point moves, however at half the speed. Should the reflecting prism be moved not in a straight line, but, as would in practice be usually the case, along a circle (e. g. about the point E), the prism would, besides its displacement in the line Y Y, undergo a rotation about its center of reflection and, as is indicated in the figure, an additional displacement perpendicular to the said line. The rotation is, as is well known, of no importance and does not alter the relative position of object point and image point at all. The movement of the prism perpendicular to the line Y Y would show itself in such a manner that the image point, while always lying on the straight line $C^3 D^3$, would make small movements in the direction perpendicular to the line Z Z. Hence, as was mentioned farther back in this specification, the radius of the circle, on which the central reflectors move, will be so chosen that the section in use of the circumference of the circle approximately coincides with the tangent.

In Figs. 1 and 2 a drum-body $a$, the shaft $b$ of which is rotatably journaled, reflecting prisms $c$, which are contiguous to one another on the periphery of the said drum, are mounted in such a manner that all the reflector centers lie in a plane, which is perpendicular to the drum-shaft $b$. Laterally of the drum and in front of the opening of the central reflectors there are shown by dotted lines a stationary projection objective marked $d$ and the film $e$, as well as an actuating wheel $f$, by which latter the film is traversed at a constant speed perpendicularly to the drum-axis. An illuminating arrangement is indicated by the carbons $g^1$ and $g^2$ of an electric arc lamp, a condenser system $h^1$, $h^2$, a reflecting prism $i$ and a film-window $k$, which limits the size of the image. The motion of the film-traversing wheel $f$ is positively transmitted to the drum $a$ by three toothed wheels $l$, $m$ and $n$, which are shown in Fig. 1, the ratio of gearing being so chosen that the rotatory speed of the optical reflector centers is half as great as the traversing speed of the film. The objective $d$ forms in the plane X X of the screen an image of the film pictures moving past in front of the film-window $k$, which image is stationary in all points relatively to the screen and is of constant luminosity.

In Figs. 3 and 4 each central reflector is divided into two parts. A drum body $a$ carries, rigidly fixed to it, two plano-parallel, annular glass disks $a^1$ and $a^2$, to which the two parts of the central reflectors, the simple reflecting prisms $c^1$ and the ridge-prisms $c^2$, are cemented; the whole system is carried by a shaft $b$, which is rotatably journaled in a casing $b^1$. Laterally of the drum there is again indicated in front of one of the rings of prisms a stationary objective $d$ and in front of the other ring of prisms a uniformly moving film $e$. The film traversing wheel $f$, which consists of a disk, not shown in Fig. 3, and of a traversing rim $f^1$, is in this case fixed coaxially to the drum, so that the otherwise necessary transmission of motion is done away with, and hence the film and the reflector drum always move in exact unison. An arrangement similar to that shown in the first example is provided for the illumination of the film pictures. Between the two glass disks $a^1$ and $a^2$ there are further in a stationary casing $o$ two glass wedges $p^1$ and $p^2$, which are in contact with one another, the outer surfaces of which are perpendicular to the axial ray and one ($p^2$) of which can be displaced relatively to the other by means of a screw $q$, for the purpose of making the optical length of the path of light and by this means the rotatory speed of the optical centers of the reflectors variable. Two springs $r^1$ and $r^2$ press the glass wedges against each other, so that in spite of the displacement they are always in contact with one another.

I claim:

1. In a cinematographic apparatus the combination with a constantly moving film of a constantly moving reflector drum, which is provided at its periphery with a set of evenly spaced central reflectors, each such central reflector containing three plane reflecting surfaces, which are perpendicular to one another.

2. In a cinematographic apparatus the combination with a constantly moving film of a constantly moving reflector drum, which is provided at its periphery with a set of evenly spaced central reflectors, consisting each of two separate parts, a simple reflecting prism and a ridge prism, both of which parts are fixed to the said drum.

3. In a cinematographic apparatus the combination with a constantly moving film of a constantly moving reflector drum, which is provided at its periphery with a set of evenly spaced central reflectors, consisting each of two separate parts, a simple reflecting prism and a ridge prism, fixed to the said drum, and adjustable glass wedges being disposed in the space between the two sets of prisms, adapted to vary the optical length of the path of light.

WALTHER BAUERSFELD.

Witnesses:
PAUL KRÜGER,
RICHARD HAKU.